United States Patent [19]

Falck

[11] Patent Number: 4,665,810
[45] Date of Patent: May 19, 1987

[54] SEAL FORMER AND FLINGER DISCHARGE ASSEMBLY FOR USE WITH APPARATUS FOR PRESSURE FEEDING AND PRESSURE COOKING A FOOD PRODUCT

[75] Inventor: Glenn H. Falck, Montgomery, Pa.

[73] Assignee: SWM Corporation, Muncy, Pa.

[21] Appl. No.: 754,845

[22] Filed: Jul. 12, 1985

[51] Int. Cl.[4] .............................................. A47J 27/14
[52] U.S. Cl. ...................... 99/348; 222/240; 366/195; 366/319
[58] Field of Search .................. 366/84, 86, 81, 79, 366/80, 82, 319, 318, 297, 83, 186, 195, 196, 312; 99/348; 222/240, 242; 425/207, 208, 209

[56] References Cited

U.S. PATENT DOCUMENTS

| | | | |
|---|---|---|---|
| 2,073,792 | 3/1937 | Gray | 222/240 |
| 3,246,594 | 4/1966 | Fisher | 99/238 |
| 3,936,038 | 2/1976 | Olmsted | 366/79 |
| 3,997,406 | 12/1976 | Arvanitakis | 366/86 |
| 4,179,043 | 12/1979 | Fischer | 222/368 |
| 4,285,271 | 8/1981 | Falck et al. | 99/348 |
| 4,312,265 | 1/1982 | Enterline | 99/348 |
| 4,384,837 | 5/1983 | Murai | 366/81 |

*Primary Examiner*—Robert W. Jenkins

[57] ABSTRACT

A seal and discharge assembly for use in the processing of farinaceous material is disclosed in which the dry food mix is introduced into a continuous pressure cooker assembly without undue pressure loss and while maintaining a regulated flow of material into the continuous pressure cooker assembly. The seal and discharge assembly comprises an extension of the root of the pressure feeder screw upon which is mounted a compacting ring for plug sealing and flinger paddles for breaking-up the plug seal and positively conveying the farinaceous material making up the plug seal into the continuous pressure cooker assembly. The root extension and the radially mounted flinger paddles are housed in a discharge chamber between a pressure feeder screw barrel and the continuous pressure cooker assembly.

6 Claims, 4 Drawing Figures

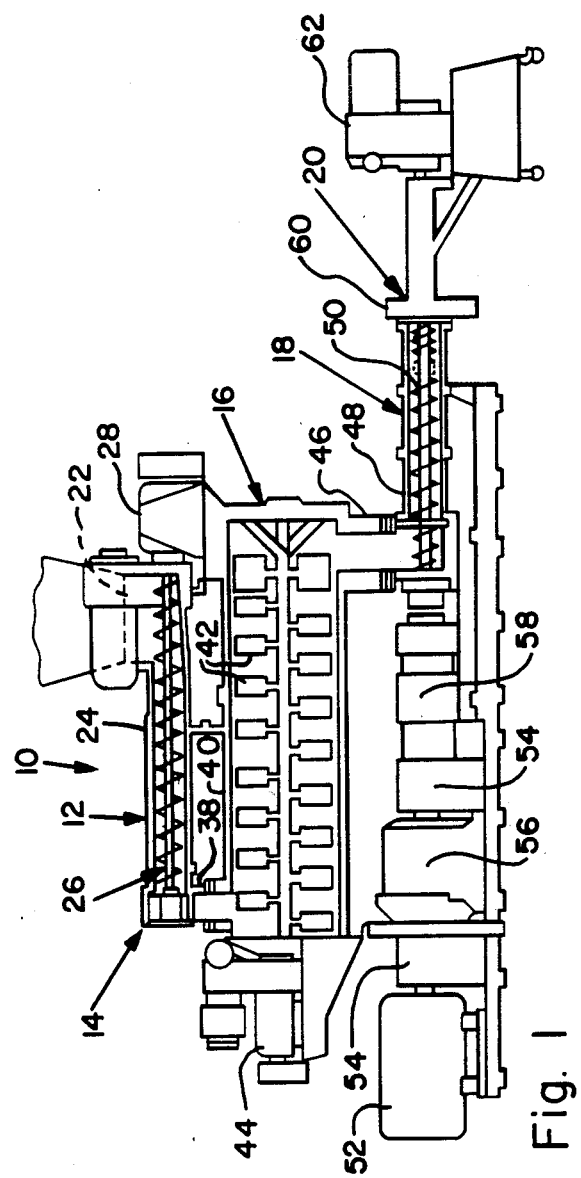
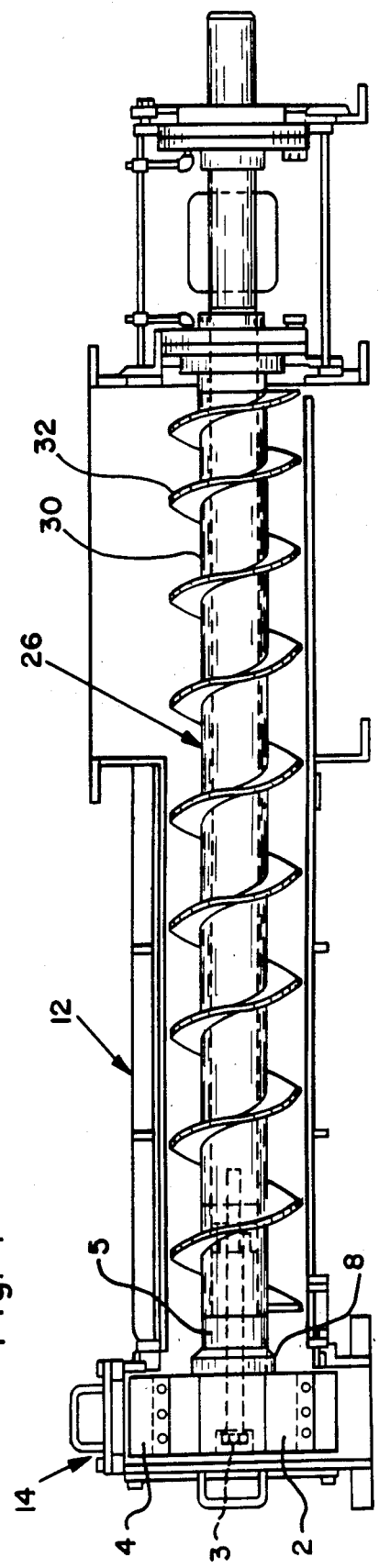

SEAL FORMER AND FLINGER DISCHARGE ASSEMBLY FOR USE WITH APPARATUS FOR PRESSURE FEEDING AND PRESSURE COOKING A FOOD PRODUCT

BACKGROUND OF THE INVENTION

1. Field of the Invention

This invention relates to continuous pressure cooking apparatus for use in feeding, conveying and/or discharging food material. In particular, the present invention relates to a sealing and discharging assembly between the pressure screw feeder assembly and the continuous pressure cooker assembly in the cooking apparatus.

2. Description of the Prior Art

The present invention is an improvement over apparatuses which are disclosed in U.S. Pat. Nos. 3,246,594 and 4,179,043, the contents of which are incorporated herein by reference.

Briefly, in the aforesaid U.S. Pat. No. 3,246,594 there is disclosed an apparatus for continuously pressure cooking various cereal materials under superatmospheric steam conditions to produce a cooked, extrudable mash and, then, extruding the cooked mash through a plurality of die orifices. An important requisite for the successful operation of this apparatus is the ability to form a pressure resistant seal at the inlet to the pressure cooker. In accordance with the patent, this seal is created by compacting the dry incoming material or particulate product mix into a pressure resistant plug in the outlet terminal end of its pressure feeder mechanism. Further, in accordance with the patent, after the seal has been formed, it is generally then desirable or necessary to abrade the compacted material back to its original particulate state to assure uniform and thorough penetration of the superatmospheric steam in the pressure cooker. A suitable mechanism and procedure for accomplishing this sealing and abrading function is disclosed in the patent.

More specifically, in accordance with the above-mentioned patent, dry incoming material is advanced from a materials inlet or hopper to the pressure cooker inlet by a pressure feeder mechanism consisting of a screw conveyor. As the material advances from the inlet of the screw conveyor to its discharge or terminal end, partial compaction of the material occurs as a result of a decrease in the flight channel depth of the feeder screw, created by increasing the root diameter of the screw. Further compaction occurs as the material advances against a rotatable and axially translatable seal plate or gate disposed in confronting relation to the outlet end of the screw conveyor. The seal plate or gate is mounted on a shaft extending through or into a feeder housing connecting the screw conveyor discharge to the pressure cooker inlet. The force with which the seal plate is held against the advancing material, as well as its axial movement, is controlled by a fluid actuated, piston-cylinder assembly connected to the distal end of the seal plate shaft. The abrasion function is accomplished by rotating the seal plate shaft and, accordingly, the seal plate and associated abrading lugs through a jack-shaft/gear drive arrangement. During normal operation, simultaneous axial movement and rotation of the seal plate shaft will continuously take place.

U.S. Pat. No. 4,285,271 provides a seal plate drive assembly comprised of a rotatable and axially translatable seal plate shaft that supports the seal plate in the feeder housing or feeder discharge housing and is telescopically received by a tubular drive shaft mounted in a pair of anti-friction bearings externally of the feeder housing and, wherein, a spline coupling preferably interconnects the two shafts to permit co-rotation while allowing axial translation of the seal plate shaft. Drive means are provided to drive the tubular drive shaft in rotation and to impart axial translation to the seal plate shaft. Also, a first seal means is disposed between the seal plate shaft and the tubular drive shaft at a location adjacent the feeder housing to prevent ingress of product mix and superatmospheric steam between the shafts and a second seal means is cooperatively associated with the feeder housing and the tubular drive shaft to prevent egress of product mix and superatmospheric steam from the feeder housing and along the outer periphery of the tubular drive shaft.

SUMMARY OF THE INVENTION

Generally in material handling applications such as in bin nomenclature, there are two kinds of flow, i.e., plug flow and mass flow. If a product held in a bin will discharge without having auxiliary devices in the bin to enable complete discharge that flow will be called mass flow. Materials that will not discharge in a standard (flat bottomed) bin usually exhibit what is called plug flow.

The invention herein is directed towards mixtures of materials having plug flow, e.g., grains, cereals, grasses and farinaceous materials in general and mixtures thereof.

In accordance with the present invention, the need for a seal plate assembly has been eliminated in apparatus for pressure cooking a farinaceous product. The applicant has invented a seal former and flinger discharge assembly which eliminates the need for all parts of the seal plate assembly. A disassembly jack screw is used to co-extensively attach a shaft extension onto the root diameter of the pressure feeder screw upon which a ring and flinger paddles are mounted. The two functions of sealing against the steam in the pressure cooker and the breaking up of compacted sealing material are performed by the ring and flinger paddles respectively. Various sized rings can be used to achieve the desired degree of compaction and therefore the desired degree of sealing against the steam pressure in the pressure cooker.

The ring can be bolted to the root diameter of the screw generating an orifice at the discharge end of the screw. The product is compacted as it passes through the orifice causing a dense plug. This product plug provides the steam seal against the continuous pressurized cooker. Rings having a constant central diameter but varying in the radial thickness of the annulus provide the compaction required for various products.

The end of the screw is equipped with flinger paddles to positively convey the material into the cooking chamber as well as keep the discharge housing clean and assist in breaking up any lump of compacted product.

The discharge chamber is divided into a bottom unshrouded discharge zone and a top shrouded zone to maintain a clean discharge housing as the flinger paddles sweep over the top shroud while radially flinging and breaking up compacted product downwardly out of the unshrouded outlet of the discharge chamber and into the pressure cooker assembly.

BRIEF DESCRIPTION OF THE DRAWINGS

The invention is further described with reference to the accompanying drawings in which:

FIG. 1 is a generally schematic illustration of a cooker/extruder processing arrangement for which the apparatus of the present invention is specifically adapted;

FIG. 2 is a side elevational view of the seal former and flinger paddle assembly of this invention and its associated pressure feeder assembly partly in section and partly with phantom lines;

DESCRIPTION OF THE PREFERRED EMBODIMENT

Figure 3:
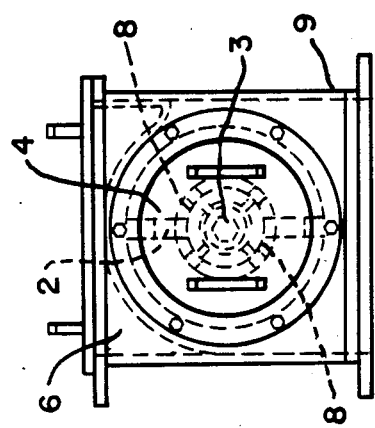
FIG. 3 is an end view of the apparatus shown in FIG. 2.
Figure 4:
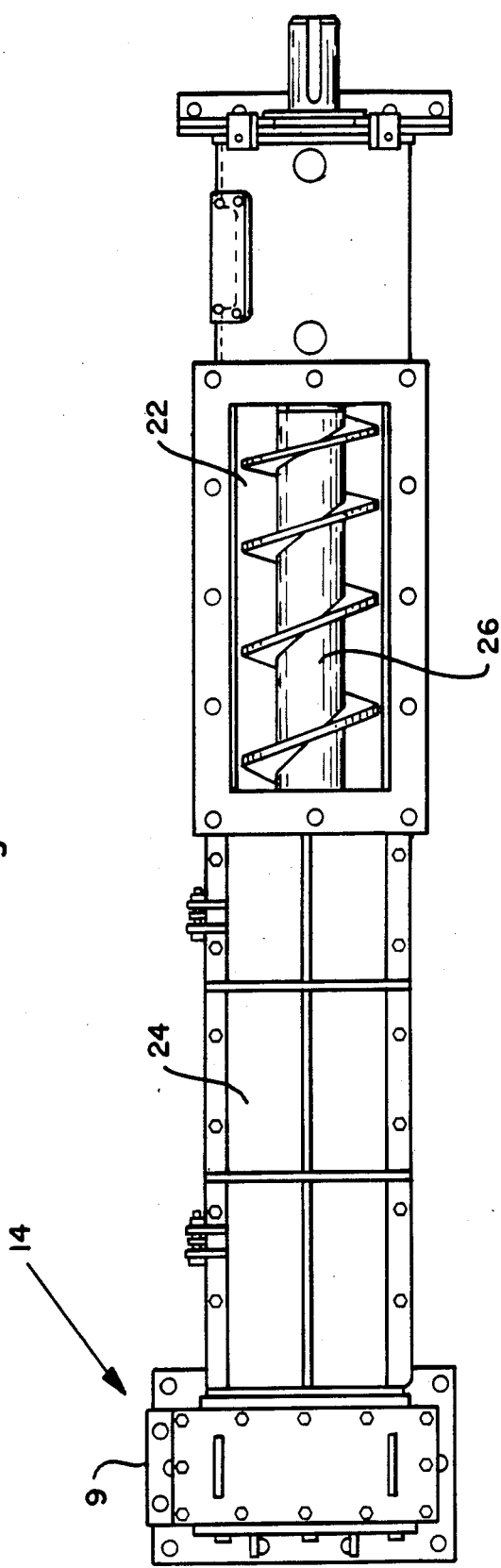
FIG. 4 is plan view of the apparatus shown in FIG. 2.

Referring to the drawings, there is shown a typical cooker/extruder apparatus 10 to which the present invention specifically relates. As therein illustrated, the apparatus 10 generally comprises a pressure feeder assembly 12, a seal former and flinger discharge assembly 14, a pressure cooker assembly 16, an extruder assembly 18 and a cut-off assembly 20. As shown, pressure feeder assembly 12 includes a feed inlet 22 into a horizontal, cylindrical, pressure feed barrel 24 containing a pressure feed screw or conveyor shown generally at numeral 26 provided with a suitable drive means 28. The screw 26 includes a shaft section known as a screw root 30 on which there is positioned a helical ribbon known as screw flight 32. Mounted as an extension of the root of the pressure feed screw 26 is the feed screw root extension 5. The screw root extension 5 is bolted into an interior lenthwise cylindrical cavity, i.e. a bore, at the terminal end and in the center of the root diameter of the pressure feed screw 26. A disassembly jack screw 3 bolts the feed screw extension in place. Mounted on the open end portion of the feed screw root extension 5 in the discharge chamber are flinger paddles as at numeral 2. Next to the flinger paddles and circling the feed screw root extension is the compacting ring 8. A discharge chamber 9 is shown providing communication between the terminal portion of the pressure feeder assembly 12 and the pressure cooker assembly 16. Pressure cooker assembly 16 essentially comprises a pressure cooker vessel 40 containing rotary mixing paddles 42, suitably journaled therein and provided with a drive means 44. Also, as is fully explained in the aforesaid patent, pressure cooker vessel 40 is suitably provided with means (not shown) for introducing therein superatmospheric steam and/or water or other liquids.

At the discharge end of cooker vessel 40 is shown an extruder inlet 46 to extruder assembly 18. Extruder assembly 18 is comprised of an extruder barrel 48, an extruder screw 50, screw drive means 52, couplings 54, a gear reducer 56, a bearing assembly 58 and, at the discharge end of the extruder barrel, an extruder die (not shown). Finally, there is shown a cut-off assembly 60, of conventional construction, for producing pellets of the extruded food product and a cut-off drive 62, also of known construction.

Referring, now, more particularly to FIG. 2, there is shown the preferred seal former and flinger discharge assembly 14 of this invention, and portions of its associated pressure feeder assembly 12. As aforesaid, product mix to be pressure cooked is fed by any suitable means into pressure feeder assembly 12. As the material or materials advance from the inlet of the pressure feeder assembly 12 to its discharge or terminal end, partial compaction of the material occurs as a result of pressure feeder screw 26 forcing material from its inlet to its discharge end. Further compaction occurs as the material advances over the compacting ring 8 disposed on the feed screw root extension 5 at the outlet end of the pressure feed screw 26. A pressure resistent plug of material at the outlet end of the pressure feeder assembly 12 is created by compaction of the dry incoming material into a annular ring plug seal as the material is conveyed over the compacting ring 8.

This pressure resistant washer-like plug seals the zone between the radial edge of the flinger paddles and the concave annulus above the ring. This concavely perforated washer-like plug seal prevents undue superatmospheric steam leakage back into the feeder screw assembly 12 from the pressure cooker vessel 40.

Further after the annular plug seal has been formed, it is then necessary to abrade the compacted material back to its original particulate state to assure uniform and thorough penetration of the superatmospheric steam in the pressure cooker. The paddles as at 2 continually breaks up the material forming the annular plug seal and exert a radial throw out motion on the abraded plug material in the outlet end of the discharge chamber 9. This motion positively conveys the material forming the annular plug seal into the pressure cooker vessel 40. At this point the material is back to nearly its original particulate state as a product mix. A shroud 6 prevents the brokenup annular plug seal material from being thrown radially outwardly anywhere but at the outlet of the discharge chamber 9. The shroud also keeps material from lodging and stagnating in the discharge chamber 9. The terminal ends of the flinger paddles 2 are fitted with replaceable tips 4 for wear economy and stagnate build-up problems. The destructive effects resulting from trapped particles between the paddles 2, the shroud 6 and the discharge chamber 9 are minimized by the replaceable tips 4. These tips 4 can be elastomeric or metallic as long as they are rigid enough to give radial extension to the paddles for the necessary throw out force to positively convey the abraded plug material into the chamber of the pressure cooker assembly. Such tips are described in greater detail in U.S. Pat. No. 4,179,043, the contents of which are incorporated herein by reference.

It will be appreciated that there has been described an apparatus by means of which the terminal end of the pressure feeder screw is effectively sealed with a compacted plug of plug flow material and by means of which the plug is then broken up and positively conveyed into the pressure cooking assembly. Although the invention has been described with a certain degree of particularity, it is to be understood that the present disclosure has been made only as an example and that the scope of the invention is defined by which is hereafter claimed.

What is claimed is:

1. In an apparatus for continuously pressure cooking food comprising a feed screw including a screw root and a screw flight axially positioned inside a tubular feed barrel, said feed barrel being connected at its terminal end to a pressurized discharged chamber having an outlet adjoining a pressure cooker assembly, wherein the improvement comprises;
   (a) an axial screw root extension projecting from the terminal end of the screw root into the discharge chamber and there being a radial displacement between said screw root and the feed barrel;

(b) a plurality of paddle members radially projecting from the axial screw root extension in the discharge chamber;

(c) constricting means for reducing the radial displacement between the screw root extension and the barrel at an axial position interposed between the terminal end of the screw root and the paddle members, such that food material in said feed barrel is continuously advanced to said constricting means by axial rotation of the screw and then compacted by said constricting means to form a seal between said discharg chamber and feed barrel and then continuously removed to the pressure cooker assembly by action of the paddle members projecting from the axial screw root extention, the action of the paddle members including abrading the compacted food material along the radial edges of the paddle members and throwing the abraded food material radially outwardly into the discharge chamber outlet.

2. The apparatus recited in claim 1 wherein the constricting means consists of a ring member mounted on the axial screw extension.

3. The apparatus as recited in claim 2 wherein the ring is removable such that it can be replaced with a ring having a different outer diameter to accommodate plug flow of various product mixes of differing particle or granular sizes, shapes and densities.

4. The apparatus as recited in claim 1 further comprising replaceable tips attached to the end of said paddle members.

5. The apparatus as recited in claim 1 wherein said screw root extension is attached to said root by means of a disassembly jack screw telescoping into a bore in said root and on a keyway in both said extension and said bore.

6. The apparatus recited in claim 1 further comprising a shroud in said discharge chamber for preventing abraded plug seal material from being thrown radially outwardly anywhere but at the outlet of the discharge chamber.

* * * * *